US008891715B2

(12) United States Patent
Ananthaswamy et al.

(10) Patent No.: US 8,891,715 B2
(45) Date of Patent: Nov. 18, 2014

(54) DIGITAL PRE-DISTORTION

(75) Inventors: Ganesh Ananthaswamy, Bangalore (IN); Sudheesh A. Somanathan, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 181 days.

(21) Appl. No.: 13/535,004

(22) Filed: Jun. 27, 2012

(65) Prior Publication Data

US 2012/0268191 A1    Oct. 25, 2012

Related U.S. Application Data

(63) Continuation-in-part of application No. 13/214,852, filed on Aug. 22, 2011.

(60) Provisional application No. 61/443,605, filed on Feb. 16, 2011.

(51) Int. Cl.
*H04L 7/00* (2006.01)
*H04L 25/03* (2006.01)

(52) U.S. Cl.
CPC .... *H04L 25/03343* (2013.01); *H04L 25/03885* (2013.01)
USPC ........... 375/358; 375/296; 375/298; 375/367; 455/43; 455/63.1

(58) Field of Classification Search
CPC ..... H03F 1/3258; H03F 1/3247; H04L 27/00; H04L 25/03885
USPC .......................... 375/358, 356, 359, 295–299
See application file for complete search history.

(56) References Cited

U.S. PATENT DOCUMENTS

| 5,991,336 | A  | * | 11/1999 | Scholtz et al. ................. 375/222 |
| 6,996,378 | B2 |   | 2/2006  | Helms |
| 7,469,491 | B2 | * | 12/2008 | McCallister et al. ......... 375/296 |
| 7,561,636 | B2 | * | 7/2009  | Song et al. .................... 375/297 |
| 7,613,251 | B2 |   | 11/2009 | Shako et al. |
| 7,948,311 | B2 |   | 5/2011  | Suzuki et al. |
| 8,045,642 | B2 | * | 10/2011 | Rexberg ........................ 375/296 |
| 8,068,557 | B2 |   | 11/2011 | Dalipi |
| 2004/0136470 | A1 |   | 7/2004  | Debruyn et al. |
| 2004/0248516 | A1 | * | 12/2004 | Demir et al. ................. 455/63.1 |
| 2005/0226346 | A1 |   | 10/2005 | Ode et al. |
| 2008/0008269 | A1 | * | 1/2008  | Menkhoff et al. ............ 375/332 |
| 2010/0289574 | A1 |   | 11/2010 | Brown et al. |

OTHER PUBLICATIONS

International Search Report and Written Opinion of the International Searching Authority in counterpart international application No. PCT/US2013/047644, report issued Sep. 4, 2013.
International Search Report and Written Opinion dated Apr. 17, 2012, in counterpart International Patent Application No. PCT/US2012/024296.

* cited by examiner

*Primary Examiner* — Qutbuddin Ghulamali
(74) *Attorney, Agent, or Firm* — Kenyon & Kenyon LLP

(57) ABSTRACT

A pre-distortion circuit that may introduce a pre-distortion signal in a communication channel by determining a harmonic signal of the signal to be output. One or more image correction signals of the signal to be output may be determined. The one or more image correction signals may be complex conjugate signal variations of the signal to be output. The harmonic signal, the one or more image correction signals and the signal to be output may be combined into a combined output signal. The combined output signal may be transmitted to a digital-to-analog converter. The predistortion circuit may be implemented in a FPGA, an ASIC, a digital-to-analog converter, and/or a separate IC package.

21 Claims, 12 Drawing Sheets

700

800

DIGITAL PRE-DISTORTION

PRIORITY

This application is a Continuation In Part application of U.S. patent application Ser. No. 13/214,852 (hereinafter the '852 application) filed Aug. 22, 2011, entitled "Digital Pre-Distortion," the content of which is incorporated herein in its entirety. The '852 application claims priority to provisional U.S. patent application Ser. No. 61/443,605 filed on Feb. 16, 2011, the content of which is incorporated herein in its entirety.

BACKGROUND

Distortion in a digital-to-analog converter (DAC) can result from parasitic effects of the components that form the DAC. Due to the parasitic effect in the DAC, harmonic signals and image signals may be generated that cause distortions in the signals transmitted downstream from the DAC. The distortion introduced by the DAC may be classified as linear or non-linear. Equalizers at the receiver may attenuate the effects of linear distortions. However, non-linear distortions such as harmonic signals and image signals are more difficult to address. Image signals may be those that are above the DAC sampling frequency, or may be signals that may result from DAC defects, for example, parasitics within the DAC, that causes spurious frequency components of the input signal that are scaled down and at arbitrary frequencies.

In a digital media cable communication implementation, interoperability standards, such as the DOCSIS/DRFI standard, exist to provide guidance as to the form of the data to be transmitted to a receiver. The DOCSIS standard is more stringent for fewer channels and, as the number of channels increases, the standard becomes less stringent. In particular, the requirement on the Spurious-Free-Dynamic-Range (SFDR) and the Adjacent-Channel-Leakage-Ratio (ACLR) becomes less stringent as the channel count goes up. Therefore, the digital signal input to the DAC might need to be further processed to substantially eliminate the harmonic and image signals that cause signal distortions.

Field programmable gate array (FPGA) devices and/or application specific integrated circuits (ASICS) are used to apply the digital processing techniques to the digital signals prior to conversion by the DAC for downstream transmission. FIG. 1 illustrates a conventional FPGA or ASIC configuration for providing digital data to a radio frequency (RF) DAC.

The digital signals are processed as complex domain signals that include components having real and imaginary representations. The complex domain data signal is combined by mixer 105 with a digital modulation signal that frequency shifts the data into data blocks of, typically, 6 or 8 MHz data. The 6 or 8 MHz data is combined into several channels by combiner 120, and remains as complex domain data. The combined data is mixed at mixer 107 with another digital modulation signal from up-conversion digital modulator 130. The digital modulation signal from up-conversion digital modulator 130 is at the carrier frequency at which the digital data will be transmitted.

The output of mixer 107 is still a complex domain signal. The complex domain signal output from the mixer 107 is transformed into a data signal including only the real signal components by real domain device 140. The real domain device 140 outputs the real domain data signal to the channel combiner 150. The channel combiner 150 combines the real signals into a block of upconverted channels that are transmitted to a DAC. The described system 100 merely provides data to a DAC and does not actively attempt to attenuate or eliminate the harmonics or image signals introduced by the DAC.

The inventors have recognized the benefits of introducing a pre-distortion into the signal transmitted over the channel to "cancel" (or attenuate) the effects of the non-linear channel distortions prior to inputting the signals to a DAC. The inventive system and method may be used in the above contexts, but as well in other applications that require non-linear harmonic distortions and/or image signal distortions in a transmission signal to be addressed. For example, the inventive system and method may be used in a wireless infrastructure (WIFR) base station where stringent emission specifications are to be met.

DETAILED DESCRIPTION

Disclosed embodiments provide a pre-distortion system that may introduce a pre-distortion signal in a communication channel. The system may include signal generators, a controller and correction modules. The signal generators may generate harmonic signals and image signals at predetermined frequencies of an input signal. The controller may select correction coefficients in response to a control signal indicating an input signal type. The correction modules may apply correction coefficients selected in response to the control signal to the generated harmonic and image signals to generate pre-distorted signals.

An alternative embodiment provides a system for eliminating distortion. The exemplary system may include a signal processing circuit, a pre-distortion circuit, and a digital-to-analog converter (DAC). The signal processing circuit may receive an input signal and generate signal distortions of the input signal for transmission. The pre-distortion circuit may apply distortion correction signals in response to a control code output by the signal processing circuit. The digital-to-analog converter may convert the combined pre-distortion signals and the generated digital signals into reduced distortion analog output signals.

Also disclosed are embodiments providing a pre-distortion device. The pre-distortion device may include a converter, a lookup table, a modulator, a combiner and a transmitter. The converter may generate, from an input signal, digital data in a complex data domain including real data components and imaginary data components. The look up table may include correction coefficients that may be used to correct harmonic distortion and image distortions. The modulator may apply correction coefficients retrieved from the look up table to the real domain and complex domain digital data, and to generate pre-distorted digital data to attenuate the characterized distortions of a DAC. The combiner may combine the pre-distorted harmonic correction signals and the pre-distorted image correction signals with the provided digital data in the real data domain and in the complex data domain. The transmitter may transmit the combined signal to the DAC.

Another embodiment may provide a method for generating pre-distortion signals to predistort a signal. The exemplary method may include receiving a digital input signal. One or more primary signals may be generated at harmonic frequencies of the input signal from the input signal based on estimated harmonic distortion induced by a DAC. One or more image correction signals of the input signal may be generated based on estimated image distortion induced by the DAC. The primary signal(s) and the image correction signal(s) may be combined and the combined signal may be output to the DAC.

Figure 1:
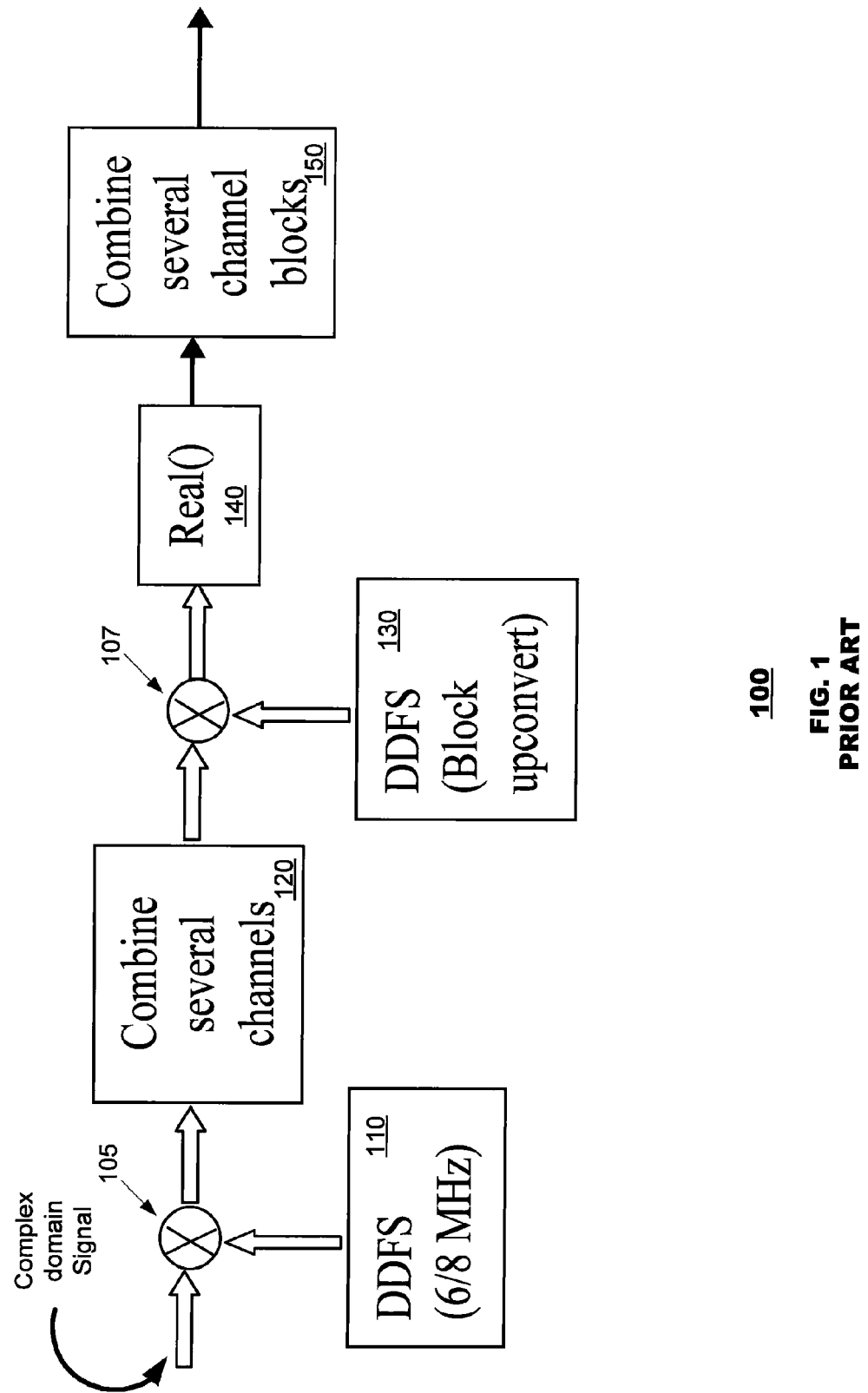
FIG. 1 illustrates a conventional FPGA or ASIC configuration for providing digital data to a radio frequency (RF) DAC.
Figure 2:
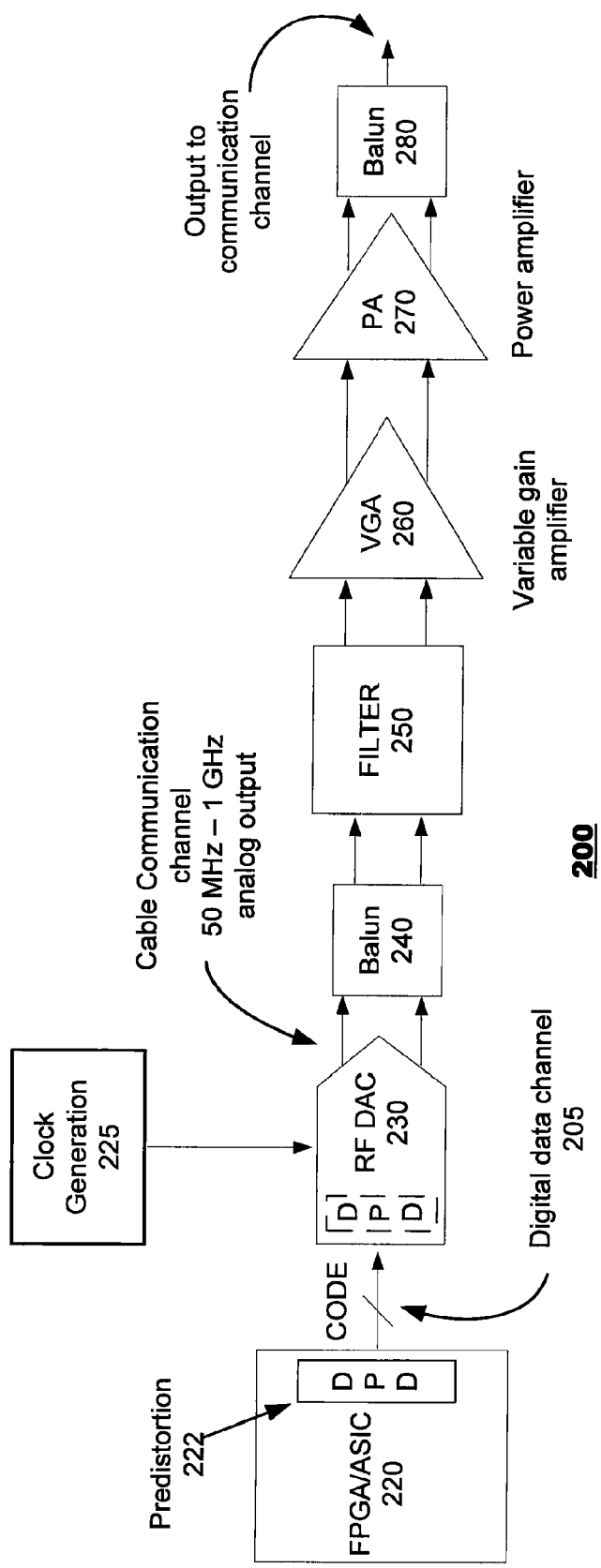
FIG. 2 illustrates an exemplary system block diagram for the transmission of signal data according to an embodiment of the present invention.

FIG. 2 illustrates an exemplary system block diagram 200 for transmitting signal data according to an embodiment of the present invention. The exemplary system 200 also may include various circuits to output a signal in the form of a voltage or a current. The exemplary system 200 may include: an FPGA/ASIC 220, a RF DAC 230, balun 240, filter 250, variable gain amplifier 260, power amplifier 270, and balun 280.

The FPGA/ASIC 220 may generate digital signals for transmission of audio and/or video media, or data content. The FPGA/ASIC 220 may include a digital pre-distortion circuit ("DPD") 222 that may generate pre-distortion signals that may be incorporated into the digital output signal (CODE) from the FPGA/ASIC 220. The RF DAC 230 may convert the digital data from the FPGA/ASIC 220 to cable communication compatible RF frequency signals. The cable communication compatible RF frequency signals may have a frequency of approximately 50 MHz-1 GHz. The RF DAC 230 may have inputs for a clock generation circuit 225 that may provide a clock signal to the RF DAC 230. The RF DAC 230 may have outputs that provide a signal to a balun 240. A balun is known in the art, and is a type of electrical transformer for balancing signals.

In an alternative embodiment, the RF DAC 230 may have the DPD 222 incorporated to receive the input signals prior to the digital-to-analog conversion circuitry. The balun 240 may have outputs to a filter 250. The filter 250 may have outputs to a variable gain amplifier 260, which may have outputs to a power amplifier 270. The power amplifier 270 may have outputs to a balun 280, which may be connected to a cable communication channel, such as a coaxial cable, or a fiber optic cable.

In operation, the FPGA/ASIC 220 may digitally process a signal for transmission of data contained within the signal. In particular, the FPGA/ASIC 220 may generate signals in the complex signal domain that may be processed by the DPD 222. The DPD 222 may generate pre-distortion signals that are incorporated into the output signal from the FPGA/ASIC 220. The predistortion processing may add artifacts to the signals input to the RF DAC 230 so that the output signals generated by the RF DAC 230 are substantially free of artifacts because the added artifacts cancel or attenuate signal distortions generated by the RF DAC 230. The RF DAC 230 may convert the digital data from the FPGA/ASIC 220 received over the digital data channel 205 to an analog signal. The clock generation 225 module may provide a clock signal to the RF DAC 230. The RF DAC 230 may output an analog signal for transmission, for example, over a cable communication channel. The analog signal output by the RF DAC 230 that is output on the cable communication channel may have a frequency of approximately 50 MHz-1 GHz. The analog signal may be filtered, amplified and power conditioned by a combination of devices such as the balun 240, the filter 250, the variable gain amplifier 260, the power amplifier 270 and the balun 280.

In an FPGA, for example, according to an embodiment of the present invention, a complex domain signal may be provided to a pre-distortion circuit that may generate distortion signals based on a characterization of the DAC to which the data signal is to be sent. An exemplary FPGA with a pre-distortion circuit will be explained in more detail with reference to FIG. 3.

Figure 3:
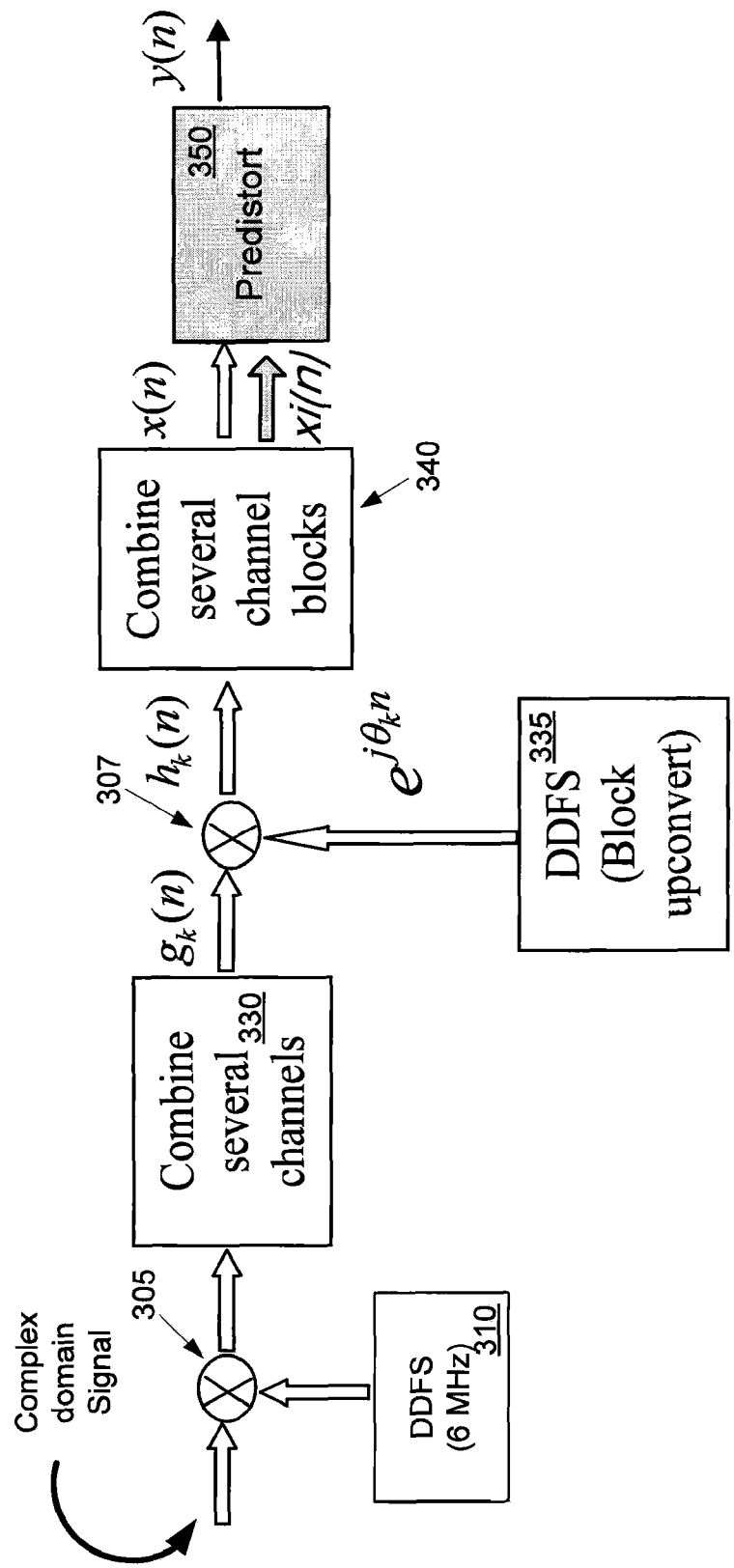
FIG. 3 illustrates a block diagram of an exemplary signal chain in an FPGA or ASIC according to an embodiment of the present invention.

FIG. 3 illustrates a block diagram of an exemplary signal chain in an FPGA or ASIC according to an embodiment of the present invention. The structure of the FPGA/ASIC 300 with pre-distortion may include an input, a first mixer 305, a digital modulator 310, a combiner 330, a second mixer 307, an up-conversion digital modulator 335 a combiner 340, and a pre-distorter 350.

The FPGA/ASIC 300 may receive, the digital data, or a generated representation of the digital data, that is to be processed as a complex domain input signal. The complex domain input signal may be applied to the first mixer 305. The first mixer 305 may also receive a carrier signal, for example, a 6 or 8 MHz signal, input from the digital modulator 310. The first mixer 305 may output a 6 or 8 MHz carrier signal which modulates the complex domain input signal. The complex domain, modulated signal may be output from the mixer 305, and may be provided to combiner 330. The combiner 330 may combine the complex domain, modulated signals with several channels, which may be provided to an input of a second mixer 307. The up-conversion digital modulator 335 may provide a carrier signal to an input of second mixer 307. The carrier signal may have a frequency suitable for transmitting the combined channels $g_k(n)$. In a cable communication application, for example, the carrier frequency may be 50 MHz-1 GHz.

The second mixer 307 may output a modulated block of primary signal and image signal channels $h_k(n)$, respectively, where k is the channel block, and n represents the time index of the signal to be transmitted, to combiner 340. At combiner 340, the modulated block of channels may be further combined by summing together several channel blocks or individual channels into channels at the upconverted modulated carrier frequency. The upconverted modulated block of primary and image channels, x(n) and xi(n), may be output from the combiner 340 to the pre-distortion circuit 350. The pre-distortion circuit 350 may apply distortion coefficients to respective signals in the upconverted, modulated block of channels to generate distorted signals y(n). The distorted signals may replicate known distortions generated in a DAC, such as RF DAC 230, for example.

The mathematics of FIG. 3 can be shown as:

$$g_k(n) = g_k^R(n) + j \times g_k^I(n) \quad \text{(Eq. 1)}$$
$$h_k(n) = g_k(n) \times e^{j\theta_k n} = [g_k^R(n)\cos(\theta_k n) - g_k^I(n)\sin(\theta_k n)] +$$
$$j \times [g_k^I(n)\cos(\theta_k n) + g_k^R(n)\sin(\theta_k n)]$$
$$x(n) = \sum_{k=1}^{L} h_k(n) = x^R(n) + j \times x^I(n)$$
$$xi(n) = x^R(n) - j \times x^I(n)$$

In Eq. 1, output signal y(n) may be a pre-distorted version of x(n) and Xi(n) based on correction factors applied to the combined signals forming x(n) and Xi(n). The terms may mean $g_k(n)$ is a complex baseband signal of a block of channels of modulated signals, $e^{j\theta_k n}$ may be a modulation term to modulate the combined several channels, $h_k(n)$ may be a modulated complex domain signal x(n) may be the output signal from an FPGA prior to any pre-distortion, and where n is a time index of the signal to be transmitted. The output of FIG. 3 is a signal containing both harmonic distortions and image distortions that are expected to be generated by a target DAC, i.e., the DAC that will perform the digital to analog conversion.

Figure 4:
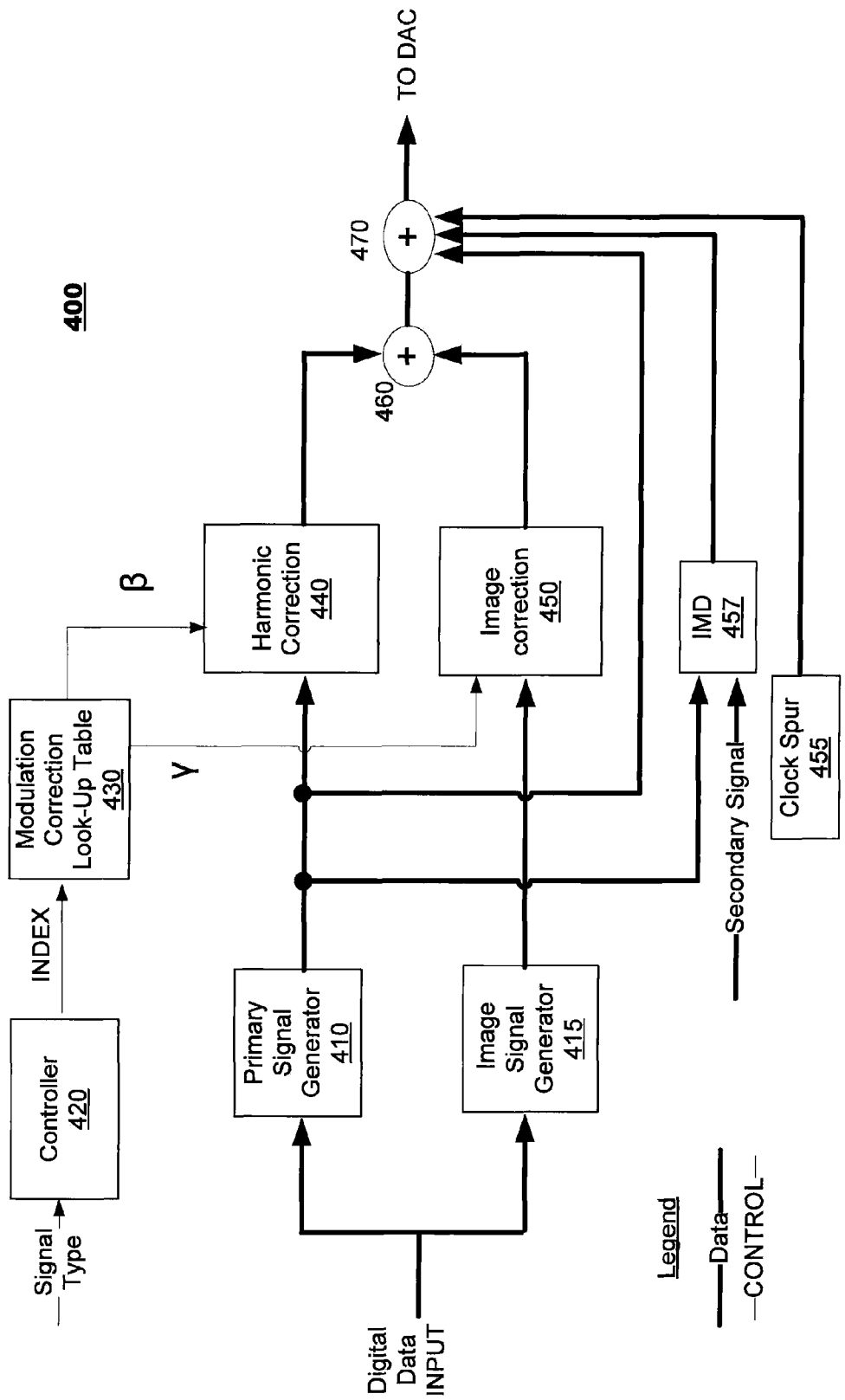
FIG. 4 illustrates an exemplary simplified block diagram of a pre-distortion circuit according to an embodiment of the present invention.

FIG. 4 illustrates an exemplary simplified block diagram of a pre-distortion circuit according to an embodiment of the present invention. The pre distortion module 400 may include a primary signal generator 410, an image signal generator 415, a controller 420, a modulation correction look-up table 430, a harmonic correction 440, an image correction 450, a clock spur correction module 455, an inter-modulation product module (IMD) 457, an adder 460, and a second adder 470 at the output. The primary signal generator 410 may be a signal processing circuit that generates signals corresponding to the desired data to be transmitted. The image signal generator 415 may be a signal processing circuit that generates signals containing image signals at particular frequencies of the input data signal. The controller 420 may control the pre-distortion module 400 based on a control input indicating an input signal type. An input signal type may be, for example, an audio signal, a video signal, a high-definition audio signal or a high definition video signal. The modulation correction look-up table 430 may store lists of distortion correction coefficients. The list of distortion correction coefficients may be generated by characterizing the performance of a plurality of different DACs. The harmonic correction 440 may apply a distortion correction coefficient to the signals output from the primary signal generator 410 to generate an image signal that cancels or attenuates harmonic distortions of a target DAC. Similarly, the image correction 450 may apply a distortion correction coefficient to the image signals output from the image signal generator 415 to generate a harmonic signal that cancels or attenuates image distortions of a DAC that is to convert the input digital data.

The clock spur distortion module 455 may correct for signal distortions resulting from the clock spurs caused, for example, by leakage or digital activity. The IMD 457 may correct for distortions that may have resulted from unwanted combining of signals during modulation.

The adder 460 and the second adder 470 may sum the signals to generate an output signal that is to be transmitted to the target DAC.

The pre-distortion module 400 may receive an input digital data signal. The complex input digital data signal may have real domain and imaginary domain components. The received digital data signal may be input to both the primary signal generator 410 and the image signal generator 415. The primary signal generator 410 may be used to generate harmonic signals at harmonic frequencies that are known to be produced by a DAC to which the output signal will be provided. The image signal generator 415 may be used to generate image signals at frequencies that are known to be produced by a DAC to which the output signal will be provided. The harmonic and image signals can be computed from the primary signal without knowledge of the primary signal frequency and through prior knowledge of the distortion mechanisms within the DAC. The controller 420 in response to an input signal may output a control signal to the modulation correction look-up table. The modulation correction look-up table 430 may have an input connected to the controller 420 and outputs connected to the harmonic correction 440 and the image correction 450. The modulation correction look-up table 430 may store correction coefficients in a look-up table. The look up table may be populated with a plurality of differing constants and correction coefficients and factors, such as correction coefficients β to correct for harmonic distortions and image correction coefficients γ to compensate for image signal distortions in the DAC. The correction coefficients may be determined by applying different signals to the DAC and calibrating the β and γ correction coefficients to values that result in acceptable harmonic and image distortion levels. The other constants, coefficients and factors may be similarly determined by exercising the DAC (and other DACs) to determine the characteristics of the target DAC. The correction coefficients that may be accessible, or provided, to the harmonic correction 440 or the image correction 450 may depend on the control signal provided by the controller 420.

The harmonic correction 440 may have an input for receiving data from the primary signal 410 and an input for receiving correction data from the modulation correction look-up table 430. The harmonic correction 440 can correct for any number of harmonics that may appear in a signal as a result of timing mismatches and other non-linear circuit characteristics of the RF DAC. The image correction 450 may have an input for receiving data from the image signal generator 415 and an input for receiving correction data. The image signal may be a scaled and frequency mirrored (folded) version of the input signal that is an unwanted signal in the desired spectrum. The image signal may, for example, be generated by modulation against a clock signal due to parasitics in the RF DAC. The image correction 450 may correct any number of image signals that may need to be corrected. The IMD 457 may receive the primary signal from the primary signal generator 410 and a secondary signal from, for example, the controller, or other source. The clock spur 455 may provide correction signals to attenuate any distortions resulting form clock signal spikes. The adder 460 may have inputs to receive signals from the harmonic correction 440 and the image correction 450. While inputs to another adder 470 may include the outputs of primary signal generator 410 and adder 460.

The output of adder 470 may be output from the pre-distortion module 400 as a pre-distorted signal to the RF DAC. The pre-distortion module 400 may be located in the same integrated circuit chip as an FPGA, a DAC or in a separate integrated chip, such as an ASIC.

In operation, the pre-distortion module 400 may receive digital data that is to be transmitted at an input. The primary signal generator 410 and image signal generator 415 may generate a primary signal and image signals representing the received digital data. The generated primary signal and image signals may have a complex domain representation including of each signal. The primary signal generator 410 and image signal generator 415 may provide the respective generated signals to both the harmonic correction 440 and the image correction 450, respectively. The controller 420 may receive a control signal indicating, for example, the type of signal being transmitted to the DAC. Based on the received control signal, the controller 420 may generate an index value that is output to the modulation correction look-up table 430. In response to the received index signal, the modulation correction look-up table 430 may output (or make available) correction coefficients to the harmonic correction 440 and image correction 450 for correcting distortions.

The IMD 457 may receive the signals generated by the primary signal generator 410 and secondary signals provided, for example, by a second primary signal generator (not shown) corresponding to a different block of channels being transmitted. The secondary signals may then be combined by the IMD 457 with signals output from the primary signal generator 410 to produce an error signal that corrects for the known inter-modulation-products of the target DAC. The correction signals may be determined when the DAC is characterized. The output of the IMD 457 may be provided to adder 470.

The clock spur correction module 455 may generate correction signals that attenuate clock spurs that may result during digital-to-analog conversion in the target DAC. These clock spurs may be determined when the DAC is characterized. The output of the clock spur correction module 455 may be provided to adder 470.

The harmonic correction 440 may apply the harmonic correction coefficients ($\beta$) to the real domain data signal and the complex domain representation of the data signal. The harmonic correction coefficients ($\beta$) may identify, for example, constants for modulating the processed real and complex/imaginary signals to cancel or attenuate the harmonic signals. The image correction 450 may apply the image correction coefficients ($\gamma$) to the real domain and complex/imaginary domain representations of the image signals. The image signals may be signals that are folded and appear in an output of the DAC. The image correction coefficients ($\gamma$) may identify constants used for modulating the processed real and complex signals to cancel or attenuate the image signals.

The corrected real domain data signal and the complex domain representation of the data signal output from the harmonic correction 440 may be applied to the adder 460. The modulated real domain data signal and the complex domain representation of the image data signal output from the image correction 450 may also be applied to the adder 460. The adder 460 may sum the provided signals, and output the signals to the adder 470. The adder 470 may sum the primary signal with the output of adder 460, and output the summed signals.

Figure 5:
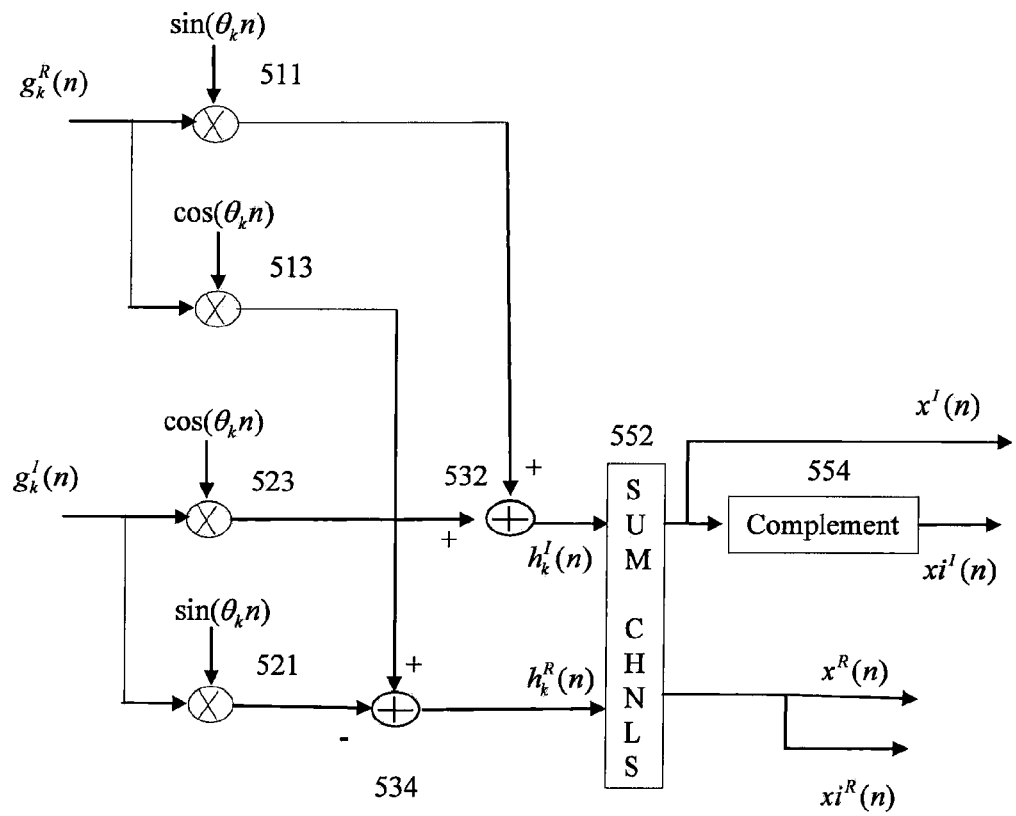
FIG. 5 illustrates an exemplary implementation for generating a primary signal and an image signal according to an embodiment of the present invention.

The primary signal generator 410 and image signal generator 415 will now be described in more detail with reference to the FIG. 5. FIG. 5 illustrates an exemplary implementation for generating the primary signal and the image signal according to an embodiment of the present invention. Other methods and implementations or configurations may be used to generate the respective primary and image signals. The signal notation of FIG. 5 is similar to that of FIG. 3 above.

Signal $g_k(n)$ may be a complex baseband signal of the $k^{th}$ block of 6 or 8 MHz signals of which signal $g_k^R(n)$ is the real part and signal $g_k^I(n)$ is the imaginary part. The notation k can represent the number of data channels, and may be 1 channel up to as many channels as the system is capable of handling. Signal $g_k^R(n)$ may be provided to a first input of mixer 511. Another input to the mixer 511 may be a sine wave signal of the form, $\sin(\theta kn)$. The output of mixer 511 [$g_k^R(n)\cdot\sin(\theta_k n)$] may be provided to adder 532. Signal $g_k^R(n)$ may also be provided to a first input of mixer 513. Another input to the mixer 513 may be a cosine wave signal of the form, $\cos(\theta kn)$. The output of mixer 513 [$g_k^R(n)\cdot\cos(\theta_k n)$] may be provided to adder 534. Signal $g_k^I(n)$ may be provided to a first input of mixer 523. Another input to the mixer 523 may be a cosine wave signal of the form, $\cos(\theta kn)$. The output of mixer 523 [$g_k^I(n)\cdot\cos(\theta_k n)$] may be provided to adder 532. Signal $g_k^I(n)$ may also be provided to a first input of mixer 521. Another input to the mixer 521 may be a sine wave signal of the form, $\sin(\theta kn)$. The output of mixer 521 may be provided to adder 534.

Adder 532 may have inputs to receive the mixed signal [$g_k^R(n)\cdot\sin(\theta_k n)$] from mixer 511 and mixed signal [$g_k^I(n)\cdot\cos(\theta_k n)$] from mixer 523. The mixed signals [$g_k^R(n)\cdot\sin(\theta_k n)$] and [$g_k^I(n)\cdot\cos(\theta_k n)$] are added by adder 532. The output $h_k^I(n)$ of adder 532 is the imaginary part of the complex signal $h_k(n)$ for the respective channel block k. Adder 534 may have inputs to receive signals from mixer 513 and mixer 521. Adder 534 may have inputs to receive the mixed signal [$g_k^R(n)\cdot\cos(\theta_k n)$] output from mixer 513 and mixed signal [$g_k^I(n)\cdot\sin(\theta_k n)$] output from mixer 521. Adder 534 outputs the difference between [$g_k^R(n)\cdot\cos(\theta_k n)$] and [$g_k^I(n)\cdot\sin(\theta_k n)$] as signal $h_k^R(n)$ for the respective channel block k.

The adder 532 and 534 may output signals $h_k^I(n)$ and $h_k^R(n)$, respectively, which may be summed for each channel k by channel summing 552. Channel summing 552 may output primary signals $x^I(n)$ (Complex/Imaginary domain) and $x^R(n)$ (Real domain). The signal xiR(n) is the same as xR(n). The complement block 554 has as an input, signal xI(n) and may output the signal xiI(n). The complement block performs the function of sign inversion i.e. its output is the negated input signal. Output data signals xi I(n), xi R(n), xI(n) and xR(n) may be provided, for example, to pre-distortion circuit 350 of FIG. 3.

Figure 6:
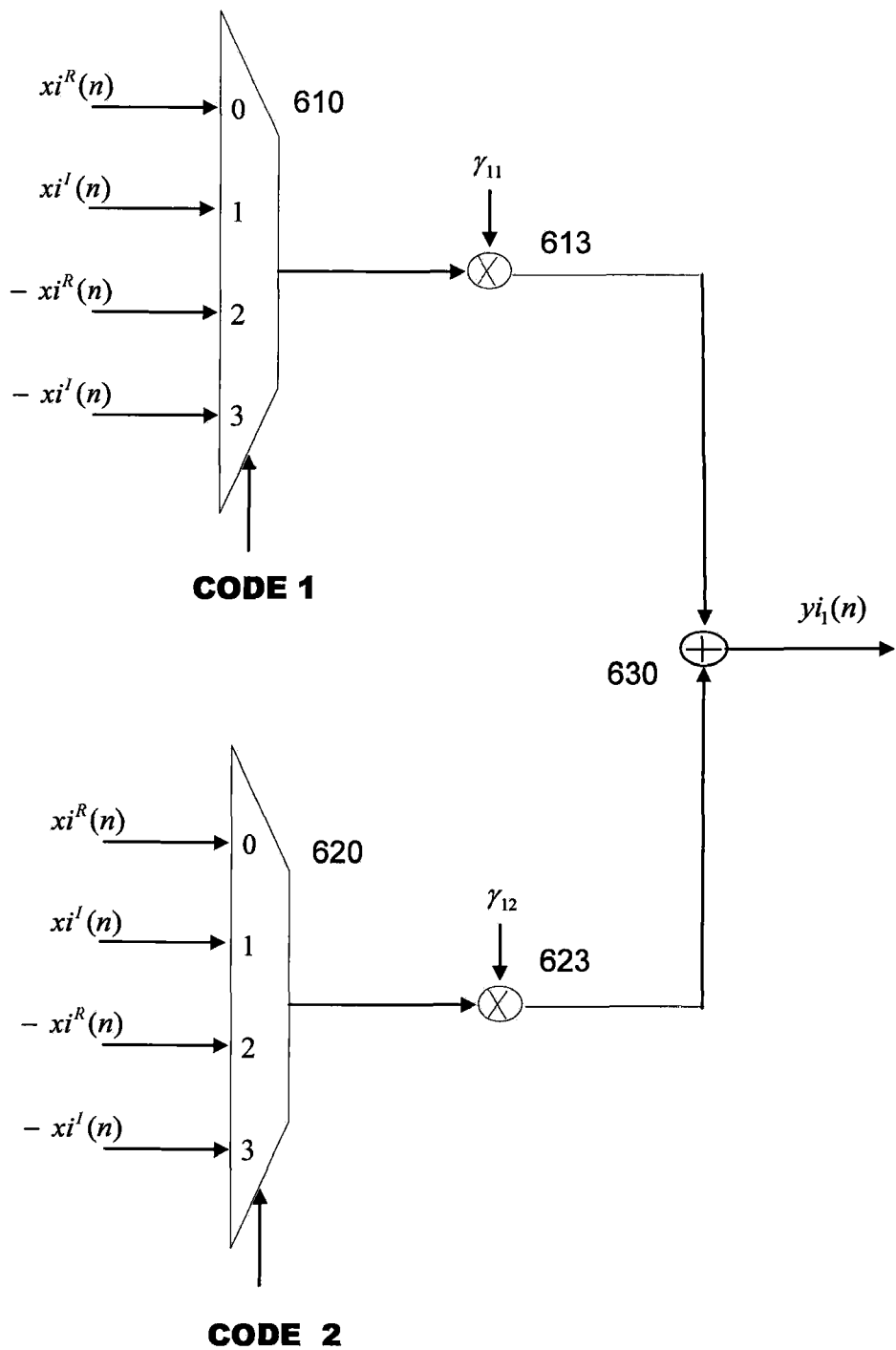
FIG. 6 illustrates the exemplary implementation of a correction circuit for modulating image signals to the appropriate frequency locations for cancellation according to an embodiment of the present invention.

FIG. 6 illustrates the exemplary implementation of a correction circuit for modulating the image signals to the appropriate locations for cancellation according to an embodiment of the present invention. Using the data signals xi$^I$ and xi$^R$ and their complements $-xi^I$ and $-xi^R$, image correction terms yi1(n) are generated.

The data signals xi$^I$ and xi$^R$ and their complements $-xi^I$ and $-xi^R$ may be provided to multiplexors 610 and 620. Multiplexor 610 may receive a code, for example, code 1, identifying which signals may be provided to the mixer 613 at different points in time. Code 1 may be based on a characterization of the DAC and may be provided, for example, from a modulation correction look-up table of FIG. 4. Modulation correction coefficients γ11 may be input to the mixer 613 to combine with the data signal provided by the multiplexor 610. The output of mixer 613 may be provided to adder 630. Similarly, multiplexor 620 may receive a code, code 2, identifying which signals are provided to the mixer 623 at different points in time. Code 2 may also be based on a characterization of the DAC and may be provided, for example, from the modulation correction look-up table of FIG. 4. Modulation correction coefficients γ12 may be input to the mixer 623 to combine with the data signal provided by the mux 620. The output of mixer 623 may be provided to adder 630, which may combine the modulated corrected signals, and output image correction signal $yi_1(n)$.

The configuration illustrated in FIG. 6 may be repeated for any number of image correction signals. For example, in an exemplary embodiment, image signals at the frequencies fdac/4-fout, fdac/2-fout, and 3fdac/4-fout may be generated using different multiplexer codes. For example, Code 1 may be the repeated pattern [0,3,2,1] and Code 2 may be the repeated pattern [1,0,3,2] for the image signal fdac/4-fout (where fout may be the center frequency of the signal being input to the DAC). For the image signal fdac/2-fout, code 1 may be the repeated pattern [0,2,0,2] and code 2 may be the repeated pattern [1,3,1,3]. Meanwhile, for the image signal 3*fdac/4-fout, code 1 may be the repeated pattern [0,1,2,3] and Code 2 may be the repeated pattern [1,2,3,0]. Using the different configurations, correction coefficients and multiplexor codes, different image correction $yi_1(n)$ signals may be generated.

Additional types of distortion may also be generated by a DAC that may or may not need to be addressed depending upon the application. For example, a high-definition audio system may require additional distortions such as intermodulation or spurious noise distortions generated by a DAC to be attenuated, while a standard definition audio signal may not. Alternative embodiments of the predistortion system can accommodate the correction of these other distortions as illustrated in FIGS. 7 and 8 below.

Figure 7:
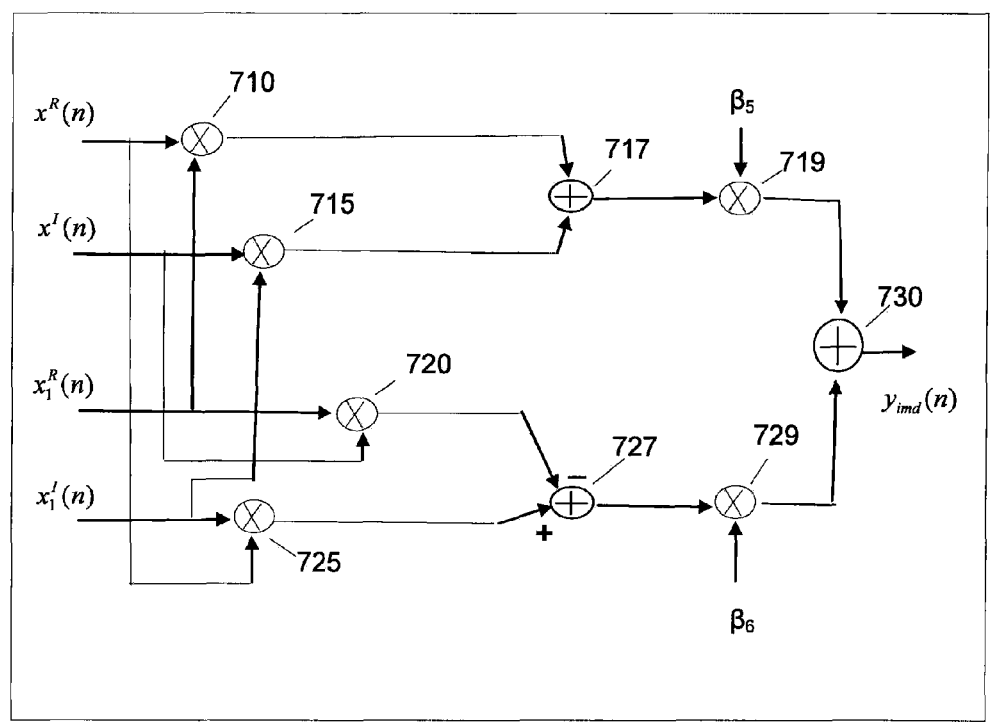
FIG. 7 illustrates an exemplary implementation of a correction circuit for generating an intermodulation distortion (IMD) cancellation term according to an embodiment of the present invention.
Figure 8:
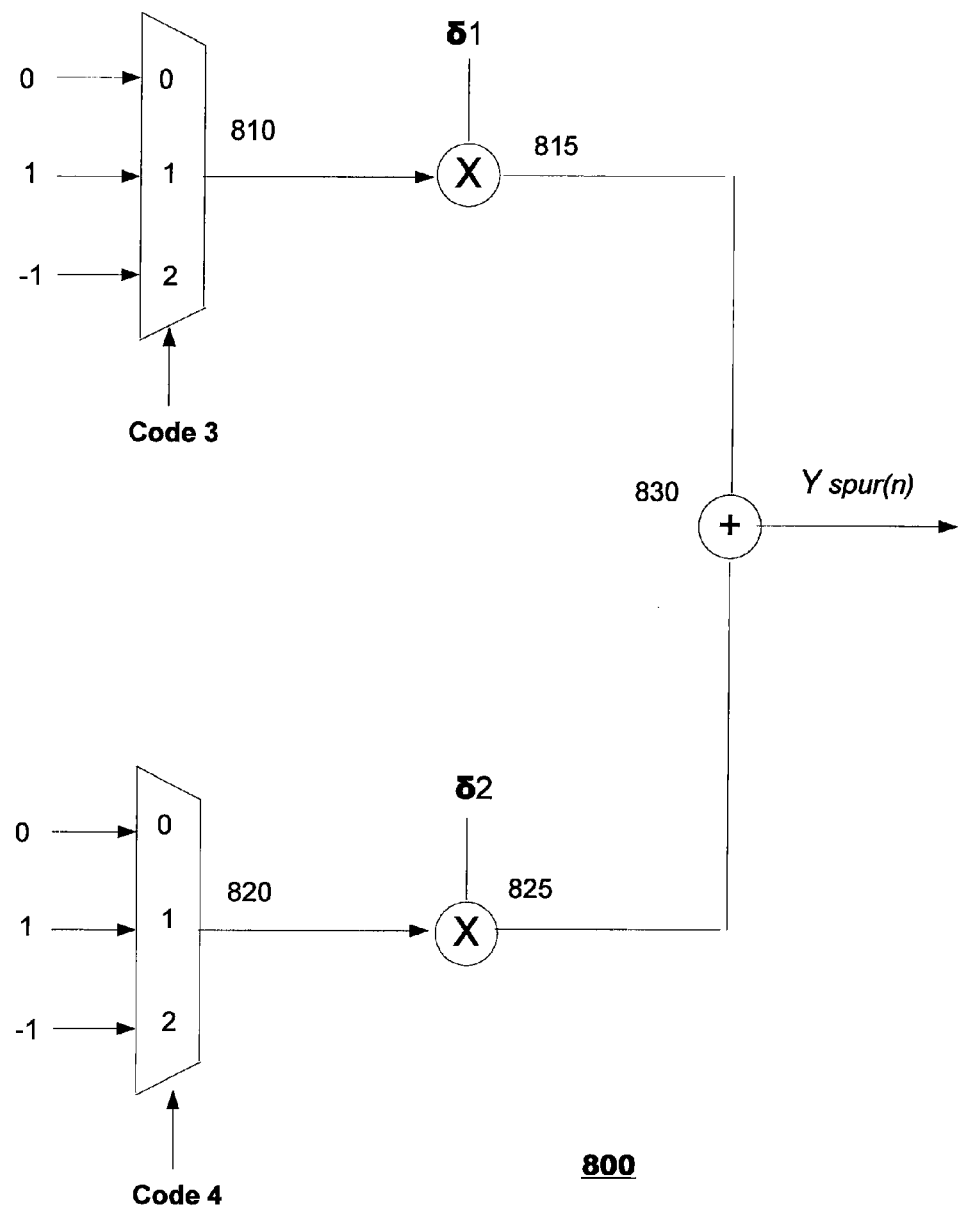
FIG. 8 illustrates an exemplary implementation of a correction circuit for generating a clock-spur correction term according to an embodiment of the present invention.

FIG. 7 illustrates an exemplary implementation of a correction circuit for generating the intermodulation distortion (IMD) cancellation term according to an embodiment of the present invention. The correction circuit 700 generates the intermodulation distortion (IMD) cancellation term. For example, signals $x_1^R(n)$ and $x_1^I(n)$ are the secondary signals corresponding to a block of channels that are separated in frequency from the primary channels $x^R(n)$ and $x^I(n)$ being pre-distorted.

In the exemplary implementation, the correction circuit 700 may include mixers 710, 715, 719, 720, 725 and 729, and adders 717, 727 and 730. The mixer 710 may have inputs for a real domain signal to be transmitted xR(n) and a real domain block of channel signals $x_1^R(n)$. The output signal $x R(n) \cdot x_1^R(n)$ of mixer 710 may be provided to adder 717. The mixer 715 may have inputs to receive signals x I(n), the imaginary part of the primary signal and $x_1^I(n)$, the imaginary part of the secondary signal. The output $x I(n) \cdot x_1^I(n)$ of mixer 715 may be provided to adder 717. Adder 717 may receive the mixed signals from mixers 710 and 715, and performs a summation operation. The added signals from adder 717 may be applied to mixer 719, which also has an input for an intermodulation distortion (IMD) cancellation term β5. The intermodulation distortion (IMD) cancellation term β35 term may also be provided by modulation correction look-up table shown in FIG. 3. The intermodulation distortion (IMD) cancellation term may be used to cancel intermodulation distortion caused by the mixing of the primary and secondary channels due to non-linearities in the DAC. The mixed signal output from mixer 719 may be provided to an input of adder 730. The mixer 720 may have inputs for imaginary domain signal to be transmitted xI(n) and real domain block of channel signals $x_1^R(n)$. The output signal $x_1^R(n) \cdot xI(n)$ from mixer 720 may be provided to adder 727. The mixer 725 may have inputs to receive signals from the real domain xR(n) and block of channel $x_1^I(n)$. The output $xR(n) \cdot x_1^I(n)$ of mixer 725 may be provided to adder 727.

Similary, adder 727 may receive the mixed signals from mixers 720 and 725, and performs a differencing operation. The added signals from adder 727 may be applied to mixer 729, which also has an input for an intermodulation distortion (IMD) cancellation term β6. The intermodulation distortion (IMD) cancellation term β6 may also be provided by modulation correction look-up table shown in FIG. 3. The intermodulation distortion (IMD) cancellation term may be used to cancel intermodulation distortion.

The mixed signal output from mixer 729 may be provided to an input of adder 730. Adder 730 may sum the mixed signals from mixers 719 and 729 to provide intermodulation distortion (IMD) cancellation term that will be forwarded to the DAC.

FIG. 8 illustrates an exemplary implementation of a correction circuit for generating a clock-spur correction term according to an embodiment of the present invention.

The structure of a clock-spur correction circuit may be similar to the circuit of FIG. 6 above. The 0, 1 and −1 terms may represent constants that are hardwired in the digital circuitry and make up the sequence that is the time-domain signature of the frequency-domain fdac/4 spur. The delta terms (δ1 and δ2) may be constants that are provided by a controller and are determined during calibration of the DAC. The signals 0, 1, −1 may be provided to multiplexors 810 and 820. Multiplexor 810 may receive a code, for example, code 3, identifying signals that may be provided to the mixer 815 at different points in time. Code 3 may be based on a characterization of the DAC and may be provided from the modulation correction look-up table of FIG. 4, and may be one of a plurality of different codes. Constant δ1 may be input to the mixer 815 to combine with the data signal provided by the multiplexor 810. The output of mixer 815 may be provided to adder 830. Similarly, multiplexor 820 may receive a code, e.g., code 4, identifying which signals are provided to the mixer 825 at different points in time. Code 4 may also be based on a characterization of the DAC, and may be provided from the modulation correction look-up table of FIG. 4. Constant δ2 may be input to the mixer 825 to combine with the data signal provided by the multiplexor 820. The constant δ1 and δ2 may be any one of a plurality of different coefficients related to different frequency-domain fdac/4 spurs, and may be stored in a modulation correction look-up table, for example as shown in FIG. 4. The output of mixer 825 may be provided to adder 830. The adder 830 may combine the modulated corrected signals, and may output a clock-spur correction signal Yspur(n). The above describes the individual generation of each of the predistortion signals that may be applied to a DAC.

Figure 9:
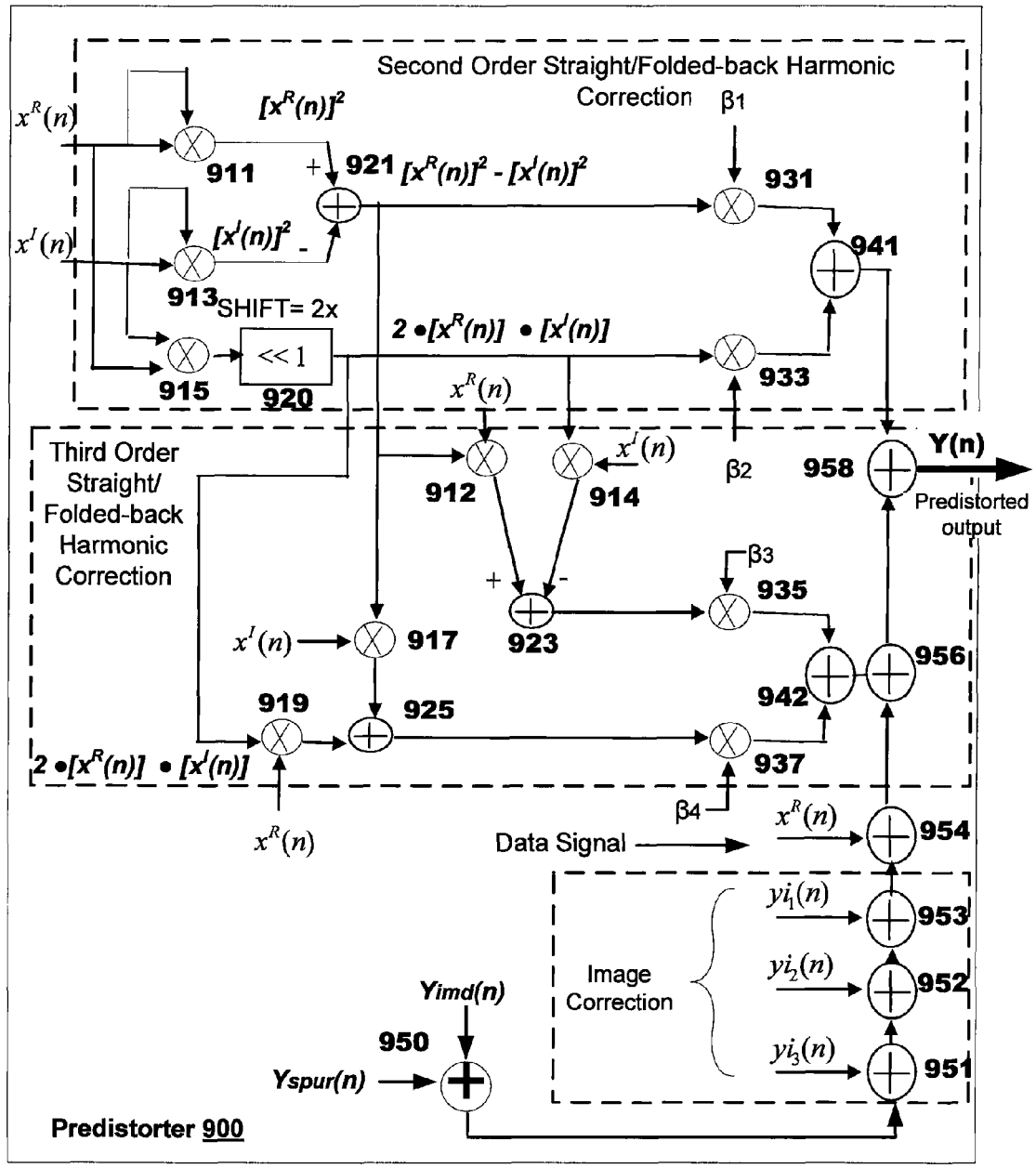
FIG. 9 illustrates an approach to canceling 2nd and the 3rd order distortions, IMD, clock spurs and images at frequencies fdac/4-fout, fdac/2-fout and 3fdac/4-fout according to an embodiment of the present invention.

FIG. 9 illustrates a combination of the individual circuits described above with respect to FIGS. 7 and 8 into a single implementation to provide a predistorted signal with the data signal to be transmitted to the DAC. FIG. 9 illustrates an approach to canceling 2nd and 3rd order distortions, IMD, clock spurs and images at fdac/4-fout, fdac/2-fout and 3fdac/4-fout according to an embodiment of the present invention.

The predistorter 900 may receive data signals, such as the data signal x(n) to be transmitted with xR(n) representing the real part and xI(n) representing the imaginary part of data signal x(n), and image correction signals $Yi_1(n)$, $yi_2(n)$, $yi_3(n)$ representing the fdac/4-fout, fdac/2-fout and 3*fdac/4-fout images, respectively. The predistorter 900 may have inputs for correction coefficients retrieved or provided from a look-up table.

When the circuit provides, second order straight/folded-back harmonic correction, the real data signal xR(n) may be input to two inputs of mixer 911, which squares the data signal. For example, the output of mixer 911 may be [xR(n)]2. The imaginary data signal xI(n) may be input into two inputs of mixer 913, and the output of mixer 913 may be $[xI(n)]^2$. The outputs of mixer 911 and 913 may be applied to adder 921.

The output of adder 921 may be the difference between the square of xR(n) and the square of xI(n). The output of adder 921 may be applied to mixer 931. Another input to mixer 931 may be a harmonic modulation correction coefficient β1 that may be obtained from a modulation correction look-up table. The output of mixer 931 may be applied to an input of adder 941.

The real data signal xR(n) and the imaginary data signal xI(n) may also be provided to mixer 915. The output of mixer 915 may be [xR(n)]·[xI(n)]. The output of mixer 915 may be applied to bitwise shift 920, which shifts the mixed [xR(n)]·[xI(n)] one bit value, which performs a multiplication by 2. The output of bitwise shift 920 may be (2×[xR(n)]·[xI(n)]). The output of bitwise shift 920 may be input to mixer 933. Another input to mixer 933 may be a harmonic modulation correction coefficient β2 that may be obtained from a modulation correction look-up table. The output of mixer 933 may be applied to an input of adder 941.

With mixed signal from mixer 931 and the mixed signal from mixer 933 applied to adder 941, the output of adder 941 may provide a straight/folded back second order harmonic correction signal. This correction signal may be used to cancel distortions caused by the second-order distortion mechanisms within the DAC. The summation of the output from mixer 931 and mixer 933 by adder 941 may be applied to adder 958 in the output signal path.

In order to provide third order straight/folded-back harmonic correction, the output of the bitwise shift 920 may be applied to mixer 919, and another input of mixer 919 may be real data signal xR(n). The output of mixer 919 may be applied to adder 925, and the output of adder 921 may be applied to mixer 917, Mixer 917 may have another input for complex data signal xI(n). The output of mixer 917 may be applied to adder 925. The summation of adder 925 may be input to mixer 937, and another input to mixer 937 may be a modulation correction coefficient β4. The output of mixer 937 may be provided to adder 942.

Mixer 912 may have an input to receive output of adder 921, and an input for real data signal xR(n). The output of mixer 912 may be applied to adder 923.

Mixer 914 may have an input for the output of bitwise shift 920, and an input for complex data signal xI(n). The output of mixer 914 may be applied to adder 923. Adder 923 may subtract the output of mixer 914 from the output of mixer 912. The output of adder 923 may be applied to mixer 935. Another input of mixer 935 may be a modulation correction coefficient β3. The output of mixer 935 may be applied to adder 942.

The output of adder 942 may provide a third order straight/folded-back harmonic correction signal. This correction signal may be used to cancel distortions caused by the third order distortion mechanisms within the DAC. The output of adder 942 may be applied to adder 956 in the output signal path.

Image correction signal $yi_1(n)$ corresponding to the fdac/4-fout image may be input to adder 953 in the output signal path. Image correction $yi_2(n)$ corresponding to the fdac/2-fout image may be input to adder 952 in the output signal path. Image correction $yi_3(n)$ corresponding to the 3*fdac/4-fout image may be input to adder 951 in the output signal path.

Additional correction signals may include the intermodulation correction signals. The intermodulation correction signal yimd(n) may be applied to adder 950 in the output signal path. This correction signal may be used to correct for the intermodulation distortion products formed from the product of any two channels in the DAC output spectrum that are widely separated in frequency. The non-linearity in the DAC switch and other non-linearities in the signal chain may give rise to these intermodulation products. Meanwhile, a spurious noise correction signal yspur(n) may be applied to adder 950 in the output signal path. The spurious noise correction signals may be used to remove the fdac/4 clock spur that is present in the output spectrum. This may be a spur caused, for example, due to on-chip digital activity at the fdac/4 rate. The sum of yimci(n) and yspur(n) from adder 950 may be applied to adder 951 in the output signal path.

Real data signal xR(n) may be applied to adder 954 in an output signal path. The output signal path may include the input signals to adders 950-954 that may be combined, and input to adder 956. The third order harmonic correction signal may be input to the input of adder 956 to be combined with combined image correction and data signals. The output of adder 956 may be applied to an input of adder 958 where it is summed with the output from third order harmonic correction. The output of adder 958 may be output from the predistorter 900 as a real signal y(n).

The predistorted output signal y(n) may include image correction signals, $yi_1(n)$, $yi_2(n)$, $yi_3(n)$, harmonic correction signals, clock-spur correction signals and data signal xR(n). Of course, depending upon the application, different combinations of correction signals may be combined to form the predistorted output signal y(n). For example, due to process variations, some DACs may not exhibit significant clock spur energy. In this case, the clock spur correction signal may not be needed. In addition, not all distortion components may be present at the output of all DACs due to varying sensitivities of the individual DACs. In this case, only the predistortion terms corresponding to the distortion components present in the DAC output are applied.

Figure 10A:
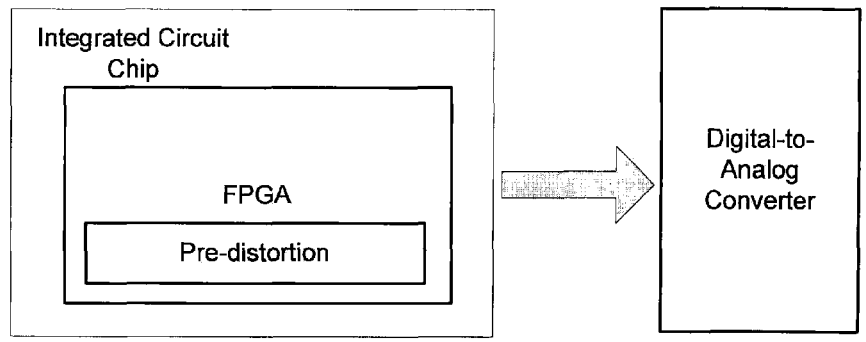
FIGS. 10A-10C provide exemplary implementations of pre-distortion circuits according to embodiments of the present invention.
Figure 10B:
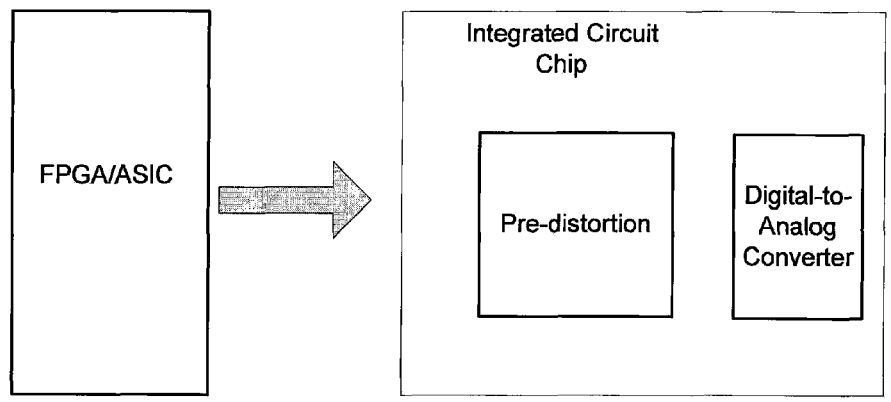
Figure 10C:
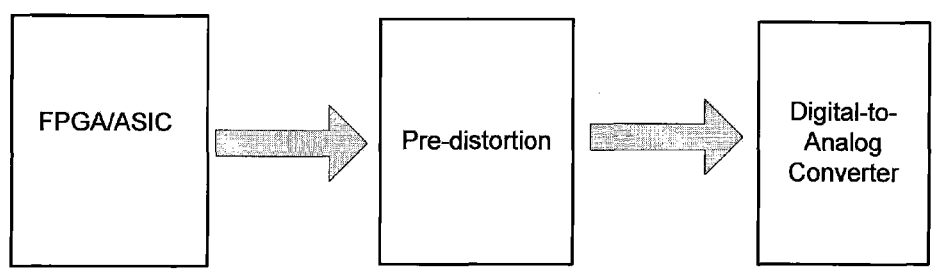

FIGS. 10A-10C provide exemplary implementations of pre-distortion circuits. As packaging techniques improve and become less expensive, it is envisioned that the pre-distortion may be implemented, for example, with the DAC packaging.

FIG. 10A may represent an integrated circuit chip with the predistortion components incorporated in an FPGA or ASIC. FIG. 10B may represent a configuration in which the predistortion components are incorporated in an IC with a digital-to-analog converter. FIG. 10C may represent a configuration in which the predistortion components are incorporated in a separate IC package.

Figure 11:
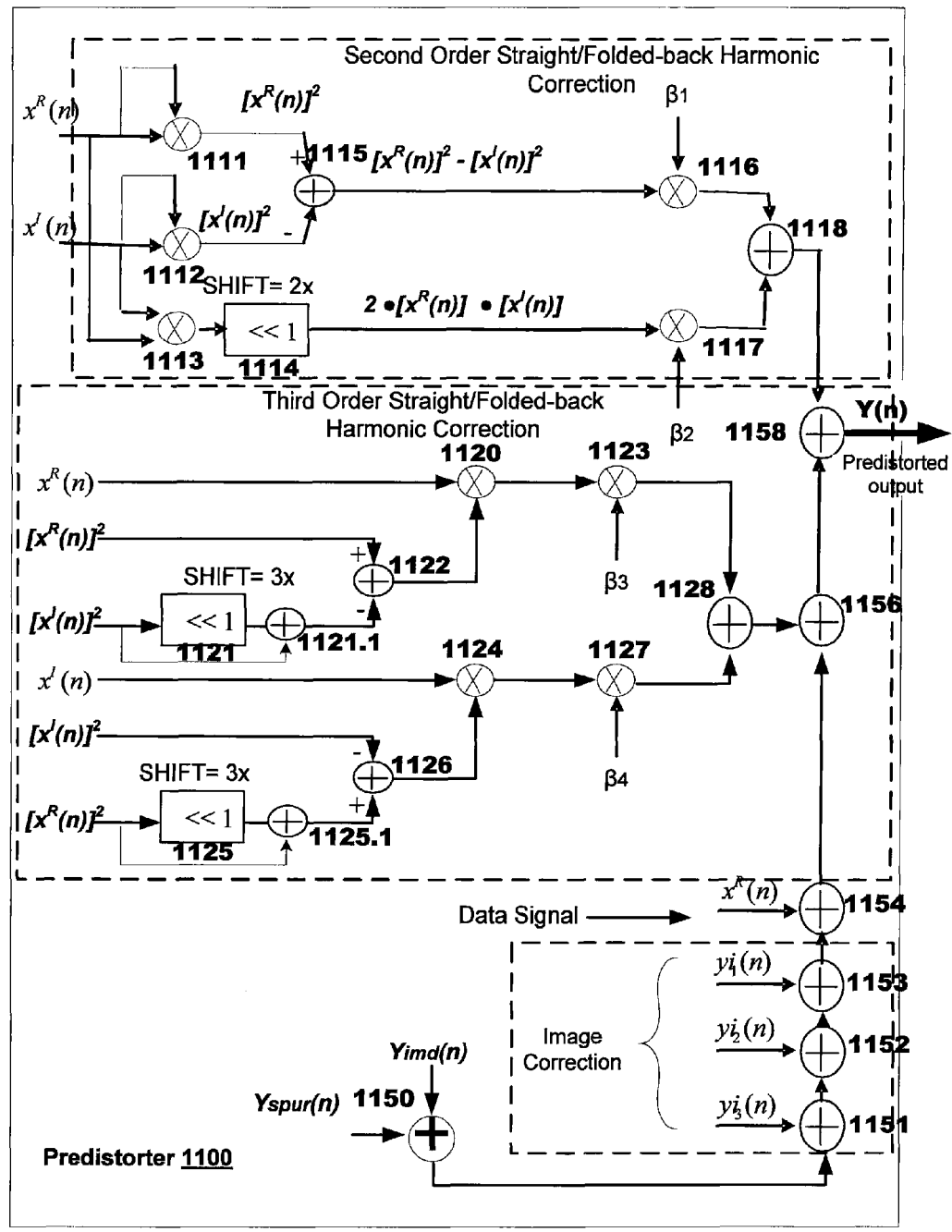
FIG. 11 illustrates an approach to canceling 2nd and the 3rd order distortions, IMD, clock spurs and images at frequencies fdac/4-fout, fdac/2-fout and 3fdac/4-fout according to an embodiment of the present invention.

FIG. 11 illustrates another embodiment of a predistorter 1100 that combines individual circuits described above for IMD cancellation (FIG. 7) and clock-spur correction (FIG. 8) into a single implementation to provide a predistorted signal with the data signal to be transmitted to the DAC. Hence, FIG. 11 illustrates the predistorter 1100 to cancel 2nd and 3rd order distortions, IMD, clock spurs and images at fdac/4-fout, fdac/2-fout and 3fdac/4-fout according to an embodiment of the present invention.

The predistorter 1100 may receive data signals, such as the data signal x(n) to be transmitted with $x^R(n)$ representing the real part and $x^I(n)$ representing the imaginary part of data signal x(n), and image correction signals $yi_1(n)$, $yi_2(n)$, $yi_3(n)$ representing the fdac/4-fout, fdac/2-fout and 3*fdac/4-fout images, respectively. The predistorter 1100 may have inputs for correction coefficients retrieved or provided from a look-up table.

The predistorter 1100 may include a second order straight/folded-back harmonic correction section, a third order straight/folded-back harmonic correction section, and an image correction section.

To provide second order straight/folded-back harmonic correction, the real data signal $x^R(n)$ may be input to two inputs of mixer 1111, which squares the data signal. For example, the output of mixer 1111 may be $[x^R(n)]^2$. The imaginary data signal $x^I(n)$ may be input into two inputs of mixer 1112, and the output of mixer 1112 may be $[x^I(n)]^2$. The outputs of mixer 1111 and 1112 may be applied to adder 1115.

The output of adder 1115 may be the difference between the square of $x^R(n)$ and the square of $x^I(n)$. The output of adder 1115 may be applied to mixer 1116. Another input to mixer 1116 may be a harmonic modulation correction coefficient β1 that may be obtained from a modulation correction look-up table. The output of mixer 1116 may be applied to an input of adder 941.

The real data signal $x^R(n)$ and the imaginary data signal $x^I(n)$ may also be provided to mixer 1113. The output of mixer 1113 may be $[x^R(n)] \cdot [x^I(n)]$. The output of mixer 1113 may be applied to bitwise shift 1114, which shifts the mixed $[x^R(n)] \cdot [x^I(n)]$ one bit position, effectively performing a multiplication by 2. The output of bitwise shift 1114 may be $(2 \times [x^R(n)] \cdot [x^I(n)])$. The output of bitwise shift 1114 may be input to mixer 1117. Another input to mixer 1117 may be a harmonic modulation correction coefficient β2 that may be obtained from a modulation correction look-up table. The output of mixer 1117 may be applied to an input of adder 1118.

With mixed signal from mixer 1116 and the mixed signal from mixer 1117 applied to adder 1118, the output of adder 1118 may provide a second order straight/folded back harmonic correction signal. This correction signal may be used to cancel distortions caused by the second-order distortion mechanisms within the DAC. The summation of the output from mixer 1116 and mixer 1117 by adder 1118 may be applied to adder 1158 in the output signal path.

The third order straight/folded-back harmonic correction section may include inputs for the data signal (e.g., $x^R(n)$ and $x^I(n)$) and for signals generated by the second order straight/folded-back harmonic section (e.g., $[x^R(n)]^2$ and $[x^I(n)]^2$ generated by mixers 1111 and 1112 respectively). To provide third order straight/folded-back harmonic correction, the real data signal $x^R(n)$ may be an input of mixer 1120. Signal $[x^I(n)]^2$ may be shifted by bitwise shift 1121 to functionally multiply by 3. The bitwise shift 1121 with adder 1121.1 may shift the signal by one bit position and add a corresponding bit value to perform the multiply by 3 operation. The output of the bitwise shift 1121 and adder 1121.1 may be applied to adder 1122. Signal $[x^R(n)]^2$ may also be applied to the adder 1122, and the adder 1122 may generate and output a difference between its two inputs (i.e., difference between $[x^R(n)]^2$ and scaled $[x^I(n)]^2$). The adder 1122 output may be another input of the mixer 1120, and the mixer 1120 output may be an input of mixer 1123. Another input of the mixer 1123 may be a modulation correction coefficient β3. The output of mixer 1123 may be applied to adder 1128.

Moreover, the imaginary data signal $x^I(n)$ may be an input of mixer 1124. Signal $[x^R(n)]^2$ may be shifted by bitwise shift 1125 and adder 1125.1 to functionally multiply by 3. The bitwise shift 1125 with adder 1125.1 may shift the signal by one bit position and add a corresponding bit value to perform the multiply by 3 operation. The output of the bitwise shift 1125 and adder 1125.1 may be applied to adder 1126. Signal $[x^I(n)]^2$ may also be applied to the adder 1126, and the adder 1126 may generate and output a difference between its two inputs (i.e., difference between shifted $[x^R(n)]^2$ and $[x^I(n)]^2$). The adder 1126 output may be another input of the mixer 1124, and the mixer 1124 output may be an input of mixer 1127. Another input of the mixer 1127 may be a modulation correction coefficient β4. The output of mixer 1127 may be applied to adder 1128.

The output of adder 1128 may provide a third order straight/folded-back harmonic correction signal. This correction signal may be used to cancel distortions caused by the third order distortion mechanisms within the DAC. The output of adder 1128 may be applied to adder 1156 in the output signal path.

Image correction signal $yi_1(n)$ corresponding to the fdac/4-fout image may be input to adder 1153 in the output signal path. Image correction $yi_2(n)$ corresponding to the fdac/2-fout image may be input to adder 1152 in the output signal path. Image correction $yi_3(n)$ corresponding to the 3*fdac/4-fout image may be input to adder 1151 in the output signal path.

Additional correction signals may include the intermodulation correction signals. The intermodulation correction signal yimd(n) may be applied to adder 1150 in the output signal path. This correction signal may be used to correct for the intermodulation distortion products formed from the product of any two channels in the DAC output spectrum that are widely separated in frequency. The non-linearity in the DAC switch and other non-linearities in the signal chain may give rise to these intermodulation products. Meanwhile, a spurious noise correction signal yspur(n) may be applied to adder 1150 in the output signal path. The spurious noise correction signals may be used to remove the fdac/4 clock spur that is present in the output spectrum. This may be a spur caused, for example, due to on-chip digital activity at the fdac/4 rate. The sum of yimd/(n) and yspur(n) from adder 1150 may be applied to adder 1151 in the output signal path.

Real data signal $x^R(n)$ may be applied to adder 1154 in an output signal path. The output signal path may include the input signals to adders 1150-1154 that may be combined, and input to adder 1156. The third order harmonic correction signal may be input to the input of adder 1156 to be combined with combined image correction and data signals. The output of adder 1156 may be applied to an input of adder 1158 where it is summed with the output from second order harmonic correction. The output of adder 1158 may be output from the predistorter 1100 as a real signal y(n).

The predistorted output signal y(n) may include image correction signals, $yi_1(n)$, $yi_2(n)$, $yi_3(n)$, harmonic correction signals, clock-spur correction signals and data signal xR(n). Of course, depending upon the application, different combinations of correction signals may be combined to form the predistorted output signal y(n). For example, due to process variations, some DACs may not exhibit significant clock spur energy. In this case, the clock spur correction signal may not be needed. In addition, not all distortion components may be present at the output of all DACs due to varying sensitivities of the individual DACs. In this case, only the predistortion terms corresponding to the distortion components present in the DAC output are applied.

The predistorter 1100 may provide efficient harmonic and image correction while reducing the number of components, namely mixers (multipliers). For example, the predistorter 1100 may include nine mixers in its harmonic correction sections, five in the second order section and four in the third order section. Mixers, typically, add unwanted and unpredictable disturbances into a system. Therefore, reduction in the number of mixers in a predistortion system provides increased performance. Furthermore, the reduction of components can become more significant as the number of parallel channels in the system increases. For example, in an eight parallel path system, a reduction of two mixers in the predistorter (say, from eleven mixers in FIG. 9 to nine mixers in FIG. 11) may be expanded to a reduction of sixteen mixers in the system.

Figure 12:
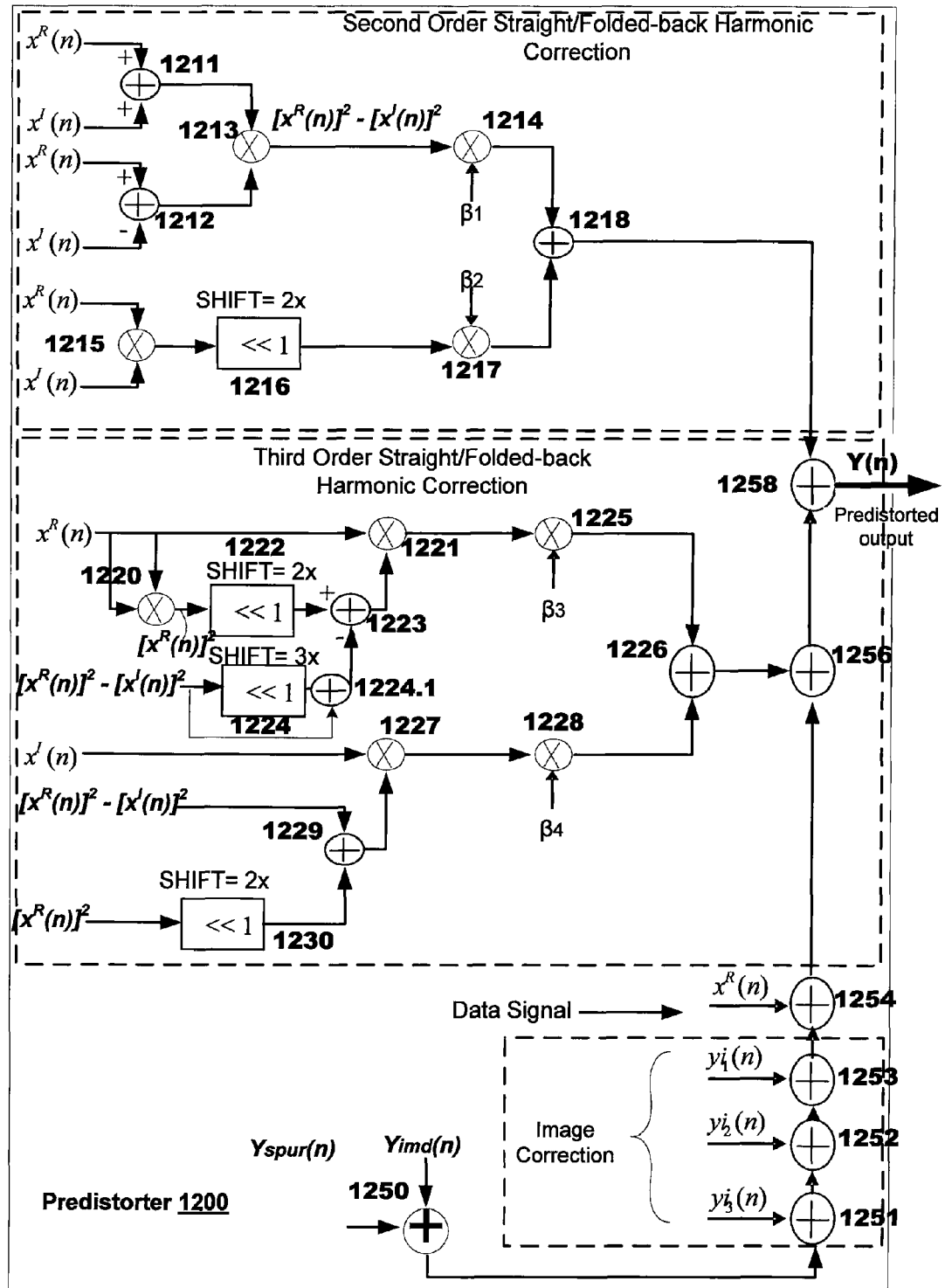
FIG. 12 illustrates an approach to canceling 2nd and the 3rd order distortions, IMD, clock spurs and images at frequencies fdac/4-fout, fdac/2-fout and 3fdac/4-fout according to an embodiment of the present invention.

FIG. 12 illustrates another embodiment of a predistorter 1200 that combines individual circuits described above for IMD cancellation (FIG. 7) and clock-spur correction (FIG. 8) into a single implementation to provide a predistorted signal with the data signal to be transmitted to the DAC. Hence, FIG. 12 illustrates the predistorter 1200 to cancel 2nd and 3rd order distortions, IMD, clock spurs and images at fdac/4-fout, fdac/2-fout and 3fdac/4-fout according to an embodiment of the present invention.

The predistorter 1200 may receive data signals, such as the data signal x(n) to be transmitted with $x^R(n)$ representing the real part and $x^I(n)$ representing the imaginary part of data signal x(n), and image correction signals $yi_1(n)$, $yi_2(n)$, $yi_3(n)$ representing the fdac/4-fout, fdac/2-fout and 3*fdac/4-fout images, respectively. The predistorter 1200 may have inputs for correction coefficients retrieved or provided from a look-up table.

The predistorter 1200 may include a second order straight/folded-back harmonic correction section, a third order straight/folded-back harmonic correction section, and an image correction section.

To provide second order straight/folded-back harmonic correction, the real data signal $x^R(n)$ may be applied to two adders 1211, 1212 respectively. The imaginary data signal $x^I(n)$ may also be applied to the two adders 1211, 1212. The adder 1211 may sum the two inputs to generate $(x^R(n)+x^I(n))$, and the adder 1212 may take the difference between the inputs to generate $(x^R(n)-x^I(n))$. The outputs of adders 1211, 1212 may be input into mixer 1213. Accordingly, the mixer may generate the difference between the square of $x^R(n)$ and the square of $x^I(n)$, which is . $[x^R(n)]^2-[x^I(n)]^2$. The output of the mixer 1213 may be an input of mixer 1214. Another input of the mixer 1214 may be a modulation correction coefficient β1. The output of mixer 1214 may be applied to adder 1218.

The real data signal $x^R(n)$ and the imaginary data signal $x^I(n)$ may also be provided to mixer 1215. The output of mixer 1215 may be $[x^R(n)]\cdot[x^I(n)]$. The output of mixer 1216 may be applied to bitwise shift 1216, which shifts the mixed $[x^R(n)]\cdot[x^I(n)]$ one bit position, effectively performing a multiplication by 2. The output of bitwise shift 1214 may be $(2\times[x^R(n)]\cdot[x^I(n)])$. The output of bitwise shift 1216 may be input to mixer 1217. Another input to mixer 1217 may be a harmonic modulation correction coefficient β2 that may be obtained from a modulation correction look-up table. The output of mixer 1217 may be applied to an input of adder 1218.

With mixed signal from mixer 1214 and the mixed signal from mixer 1217 applied to adder 1218, the output of adder 1218 may provide a second order straight/folded back harmonic correction signal. This correction signal may be used to cancel distortions caused by the second-order distortion mechanisms within the DAC. The summation of the output from mixer 1214 and mixer 1217 by adder 1218 may be applied to adder 1258 in the output signal path.

The third order straight/folded-back harmonic correction section may include inputs for the data signal (e.g., $x^R(n)$ and $x^I(n)$) and for signals generated by the second order straight/folded-back harmonic section (e.g., $[x^R(n)]^2-[x^I(n)]^2$). To provide third order straight/folded-back harmonic correction, the real data signal $x^R(n)$ may be input to two inputs of mixer 1220, which squares the real data signal, and to an input of mixer 1221. The output of mixer 1220 may be $[x^R(n)]^2$, and the output of the mixer 1220 may be input to bitwise shift 1222, which shifts the mixed $[x^R(n)]^2$ one bit value, which performs a multiplication by 2. The output of bitwise shift 1222 may be $(2\times[x^R(n)]^2)$. The output of bitwise shift 1222 may be applied to adder 1223.

Signal $[x^R(n)]^2-[x^I(n)]^2$ may be input to bitwise shift 1224, which shifts the signal $[x^R(n)]^2-[x^I(n)]^2$ to functionally multiply by 3. The bitwise shift 1224 with adder 1224.1 may shift the signal by one bit value and add a corresponding bit value to perform the multiply by 3 operation. The output of the bitwise shift 1224 and adder 1224.1 may be applied to the adder 1223, and the adder 1223 may generate and output a difference between its two inputs (i.e., difference between shifted $[x^R(n)]^2$ and shifted $[x^R(n)]^2-[x^I(n)]^2$). The adder 1223 output may be another input of mixer 1221, and the mixer 1221 output may be an input of mixer 1225. Another input of the mixer 1225 may be a modulation correction coefficient β3. The output of mixer 1225 may be applied to adder 1226.

Moreover, the imaginary data signal $x^I(n)$ may be an input of mixer 1227. Signal $[x^R(n)]^2-[x^I(n)]^2$ may be applied to adder 1229. Signal $[x^I(n)]^2$ may be shifted by one bit value, to functionally multiply by two, by bitwise shift 1230, and the output of the bitwise shift 1230 may be applied to adder 1229. The output of the adder 1229 may be another input of the mixer 1227, and the output of the mixer 1227 may be an input of mixer 1228. Another input of the mixer 1228 may be a modulation correction coefficient β4. The output of mixer 1228 may be applied to adder 1226.

The output of adder 1226 may provide a third order straight/folded-back harmonic correction signal. This correction signal may be used to cancel distortions caused by the third order distortion mechanisms within the DAC. The output of adder 1226 may be applied to adder 1256 in the output signal path.

Image correction signal $yi_1(n)$ corresponding to the fdac/4-fout image may be input to adder 1253 in the output signal path. Image correction $yi_2(n)$ corresponding to the fdac/2-fout image may be input to adder 1252 in the output signal path. Image correction $yi_3(n)$ corresponding to the 3*fdac/4-fout image may be input to adder 1251 in the output signal path.

Additional correction signals may include the intermodulation correction signals. The intermodulation correction signal $y_{imd}(n)$ may be applied to adder 1250 in the output signal path. This correction signal may be used to correct for the intermodulation distortion products formed from the product of any two channels in the DAC output spectrum that are widely separated in frequency. The non-linearity in the DAC switch and other non-linearities in the signal chain may give rise to these intermodulation products. Meanwhile, a spurious noise correction signal yspur(n) may be applied to adder 1250 in the output signal path. The spurious noise correction signals may be used to remove the fdac/4 clock spur that is present in the output spectrum. This may be a spur caused, for example, due to on-chip digital activity at the fdac/4 rate. The sum of yimd/(n) and yspur(n) from adder 1250 may be applied to adder 1251 in the output signal path.

Real data signal $x^R(n)$ may be applied to adder 1254 in an output signal path. The output signal path may include the input signals to adders 1250-1254 that may be combined, and input to adder 1256. The third order harmonic correction signal may be input to the input of adder 1256 to be combined with combined image correction and data signals. The output of adder 1256 may be applied to an input of adder 1258 where it is summed with the output from third order harmonic correction. The output of adder 1258 may be output from the predistorter 1200 as a real signal y(n).

The predistorted output signal y(n) may include image correction signals, $yi_1(n)$, $yi_2(n)$, $yi_3(n)$, harmonic correction signals, clock-spur correction signals and data signal xR(n). Of course, depending upon the application, different combinations of correction signals may be combined to form the predistorted output signal y(n). For example, due to process variations, some DACs may not exhibit significant clock spur energy. In this case, the clock spur correction signal may not be needed. In addition, not all distortion components may be present at the output of all DACs due to varying sensitivities of the individual DACs. In this case, only the predistortion terms corresponding to the distortion components present in the DAC output are applied.

The predistorter 1200 may provide efficient harmonic and image correction while reducing the number of components, namely mixers (multipliers). For example, the predistorter 1200 may include nine mixers in its harmonic correction sections, four in the second order section and five in the third order section. Mixers, typically, add unwanted and unpredictable disturbances into a system. Therefore, reduction in the number of mixers in a predistortion system provides increased performance while reducing the number of components. Furthermore, the reduction of components can become more significant as the number of parallel channels in the system increases. For example, in an eight parallel path system, a reduction of two mixers in the predistorter (say, from eleven mixers in FIG. 9 to nine mixers in FIG. 12) may be expanded to a reduction of sixteen mixers in the system.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure.

What is claimed is:

1. A predistortion system to generate a predistortion signal, comprising:
    a second order harmonic correction section including a first set of mixers to generate a second harmonic correction signal based on real and imaginary parts of a data signal and to generate at least one intermediate signal for the second harmonic correction signal generation, wherein a difference of the squares of the real and imaginary parts of the data signal to be generated using at least one mixer of the first set of mixers, and wherein another two mixers of the first set of mixers having inputs for a first set correction coefficients;
    a third order harmonic correction section including a second set of mixers to generate a third harmonic correction signal based on the real and imaginary parts of the data signal and the at least one intermediate signal including at least a component of the difference of the squares of the real and imaginary parts of the data signal, wherein two mixers of the second set of mixers having inputs for a second set of correction coefficients;
    an image correction section to generate an image correction signal; and
    an output for the predistortion signal, wherein the predistortion signal is a combination of the second harmonic correction signal, third harmonic correction signal, and the image correction signal.

2. The predistortion system of claim 1, wherein the predistortion system includes less than twelve mixers.

3. The predistortion system of claim 2, wherein the predistortion system includes nine mixers.

4. The predistortion system of claim 1, wherein the first set of mixers comprise five mixers and the second set of mixers comprise four mixers.

5. The predistortion system of claim 1, wherein the first set of mixers comprise four mixers and the second set of mixers comprise five mixers.

6. The predistortion system of claim 1, wherein the at least one intermediate signal includes a square of the real part signal.

7. The predistortion system of claim 1, wherein the at least one intermediate signal includes the difference of the squares of the real and imaginary parts of the data signal.

8. The predistortion system of claim 1, wherein the second and third harmonic correction signals are also based on correction coefficients selected in response data signal type.

9. The predistortion system of claim 1, wherein the predistortion system is provided on a common integrated circuit with a digital-to-analog converter (DAC).

10. The predistortion system of claim 1, wherein the output is coupled to a DAC, and the predistortion system is provided on an integrated circuit separate of the DAC.

11. A predistortion system, comprising:
    a harmonic correction module including a plurality of mixers to generate harmonic correction signals based on real and imaginary parts of an input data signal and on a set of correction coefficients selected in response to input data signal type,
        wherein the harmonic correction module includes a first set of mixers in a second harmonic correction section to generate a second harmonic correction signal, and a difference of the squares of the real and imaginary parts of the data signal to be generated using at least one mixer of the first set of mixers, and wherein another two mixers of the first set of mixers having inputs for a first subgroup of the set of correction coefficients, and
        wherein the harmonic correction module includes a second set of mixers to generate a third harmonic correction signal based on at least a component of the difference of the squares of the real and imaginary parts of the data signal, wherein two mixers of the second set of mixers having inputs for a second subgroup of the set of correction coefficients;
    an image correction module to generate an image correction signal;
    a combiner module to combine the harmonic correction signals and the image correction signal to generate a predistortion signal.

12. The predistortion system of claim 11, wherein
the second harmonic correction section comprises
    a first mixer to square the real part, $x^R(n)$,
    a second mixer to square the imaginary part, $x^I(n)$,
    a first adder to generate a difference between outputs of the first and second mixer,
    a third mixer to multiply $x^R(n)$ and $x^I(n)$ together,
    a first bitwise shifter to shift output of the third mixer,
    a fourth mixer to multiply output of the first adder and a first correction coefficient,
    a fifth mixer to multiply output of the first bitwise shifter and a second correction coefficient, and
    a second adder to combine outputs of the fourth and fifth mixers to generate a second harmonic correction signal; and the third harmonic correction section comprises
- a second bitwise shifter with an associated shift adder to shift the squared imaginary part, $x^I(n)^2$,
- a third adder to generate a difference between the squared real part, $x^R(n)^2$, and output of the second bitwise shifter,
- a sixth mixer to multiply $x^R(n)$ and output of the third adder,
- a third bitwise shifter with an associated shift adder to shift $x^R(n)^2$,
- a fourth adder to generate a difference between output of the third bitwise shifter and $x^I(n)^2$,
- a seventh mixer to multiply $x^I(n)$ and output of the fourth adder,
- an eighth mixer to multiply output of the sixth mixer and a third correction coefficient,
- a ninth mixer to multiply output of the seventh mixer and a fourth correction coefficient, and
- a fifth adder to combine outputs of the eighth and ninth mixer to generate a third harmonic correction signal.

13. The predistortion system of claim 11, wherein the predistortion system includes nine mixers.

14. The predistortion system of claim 11, wherein
the second harmonic correction section comprises
- a first adder to generate a difference between the real part, $x^R(n)$, and the imaginary part, $x^I(n)$,
- a second adder to generate a sum of the real part, $x^R(n)$, and the imaginary part, $x^I(n)$,
- a first mixer to multiply outputs of the first and second adders to generate $[x^R(n)]^2-[x^I(n)]^2$,
- a second mixer to multiply $x^R(n)$ and $x^I(n)$,
- a first bitwise shifter to shift output of the second mixer,
- a third mixer to multiply output of the first mixer and a first correction coefficient;
- a fourth mixer to multiply output of the first bitwise shifter and a second correction coefficient, and
- a third adder to combine outputs of the third and fourth mixers to generate a second harmonic correction signal; and the third harmonic correction section comprises
- a fifth mixer to square $x^R(n)$ to generate $x^R(n)^2$,
- a second bitwise shifter to shift output of the fifth mixer,
- a third bitwise shifter with an associated shift adder to shift $[x^R(n)]^2 - [x^I(n)]^2$,
- a fourth adder to generate a difference between output of the second bitwise shifter and the third bitwise shifter;
- a sixth mixer to multiply $x^R(n)$ and output of the fourth adder,
- a fourth bitwise shifter to shift $x^R(n)^2$,
- a fifth adder to combine $[x^R(n)]^2 - [x^I(n)]^2$ and output of the fourth bitwise shifter,
- a seventh mixer to multiply $x^I(n)$ and output of the fifth adder,
- an eighth mixer to multiply output of the sixth mixer and a third correction coefficient,
- a ninth mixer to multiply output of the seventh mixer and a fourth correction coefficient, and
- a sixth adder to combine outputs of the eighth and ninth mixers to generate a third harmonic correction signal.

15. The predistortion system of claim 11, wherein the predistortion system includes less than twelve mixers.

16. The predistortion system of claim 11, further comprises a transmitter to transmit the predistortion signal to a digital-to-analog converter (DAC).

17. The predistortion system of claim 11, wherein the predistortion system is provided on a common integrated circuit with a digital-to-analog converter (DAC).

18. The predistortion system of claim 11, wherein the predistortion system is provided on an integrated circuit separate of the DAC.

19. A method of generating a predistortion signal, comprising:
- receiving a data signal, the data signal comprising a real portion and an imaginary portion;
- generating a second harmonic correction signal, using a first set of mixers, based on the real and imaginary portions and a first set of correction coefficients including generating a difference of the squares of real and imaginary portions of the data signal using at least one mixer of the first set of mixers and inputting the first set of correction coefficients into another two mixers of the first set of mixers, wherein in generating the second harmonic correction signal, at least one intermediate signal is generated;
- based on the real and imaginary portions, a second set of correction coefficients, and the at least one intermediate signal including at least a component of the difference of the squares of real and imaginary portions of the data signal, generating a third harmonic correction signal, using a second set of mixers, including inputting the second set of correction coefficients into two mixers of the second set mixers;
- generating an image correction signal; and
- combining the second harmonic correction signal, the third harmonic correction signal, and the image correction signal to generate the predistortion signal.

20. The method of claim 19, wherein generating the second and third harmonic correction signal with less than twelve mixers.

21. The method of claim 20, wherein generating the second and third harmonic correction signal with nine mixers.

* * * * *